Feb. 4, 1969     J. S. PRICE     3,425,340
COOKING UTENSIL
Filed June 16, 1967
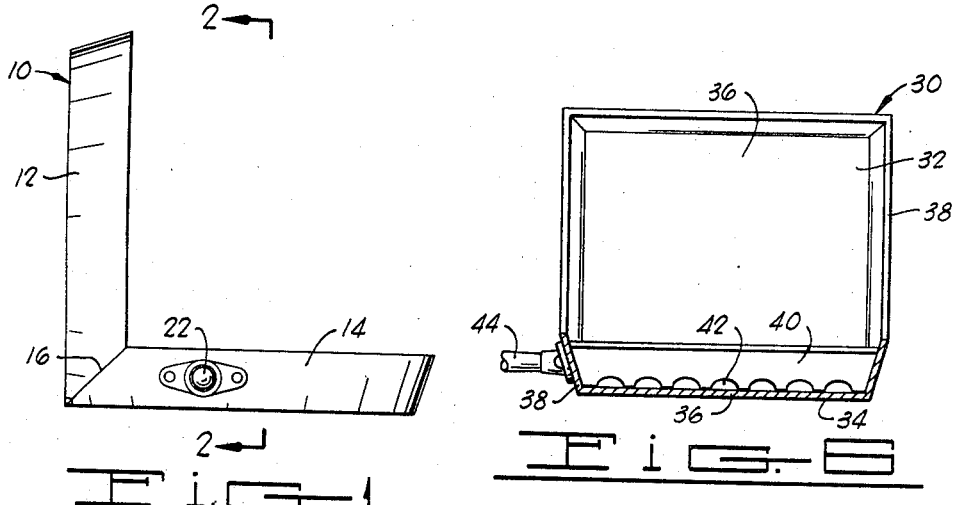
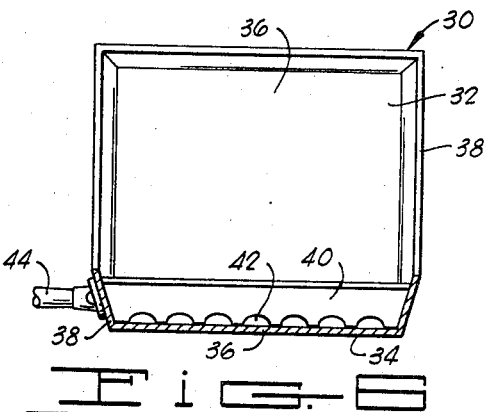
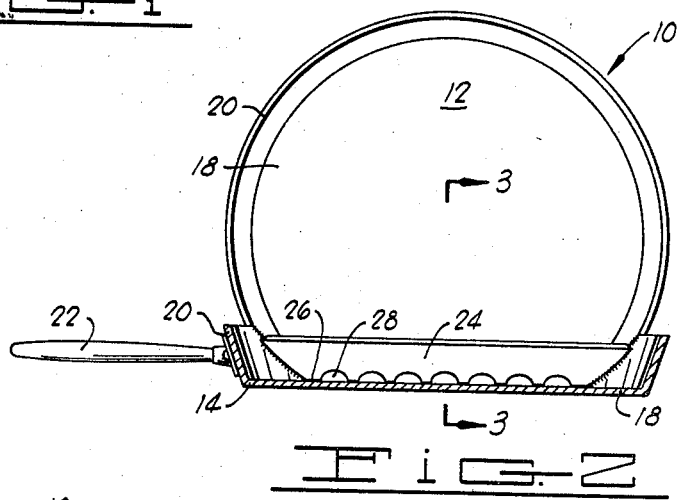
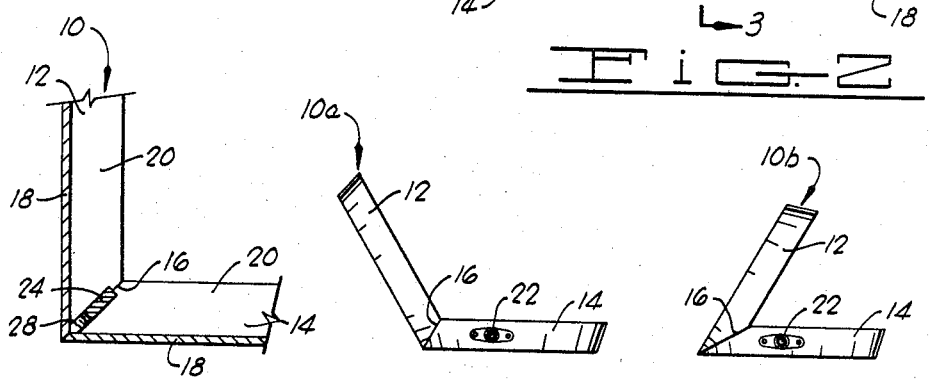
INVENTOR.
JOEL S. PRICE
BY
Dunlap and Laney
ATTORNEYS 3,425,340
COOKING UTENSIL
Joel S. Price, 912 NW. 37th, Oklahoma
City, Okla. 73118
Filed June 16, 1967, Ser. No. 646,570
U.S. Cl. 99—422                                                10 Claims
Int. Cl. A47d 37/10

ABSTRACT OF THE DISCLOSURE

A double frying pan wherein food, such as an egg, is cooked on one side in one pan and then inverted into the other pan for cooking on the other side. A turning plate is positioned between the pans in a postion to engage an edge of the food being moved from one pan into the other to facilitate turning the food.

BACKGROUND OF THE INVENTION

Field of the invention

This invention relates generally to improvements in cooking utensils, and more particularly, but not by way of limitation, to a utensil for cooking fried foods.

Description of the prior art

As it is well known in the art, some fried foods, and particularly eggs, are difficult to turn for frying on both sides without damaging the appearance of the food. A frying egg is normally turned over by physically lifting the egg from the frying pan and then redepositing the egg in the same frying pan on its other side, and only a minor portion of cooks are capable of turning an egg without breaking the yolk of the egg.

Various efforts have been made to construct a frying pan to facilitate turning an egg, such as by providing a curved lip at one end of the frying pan with the object in mind of turning the egg by simply reciprocating the pan. However, to the best of my knowledge, no acceptable utensil has been previously provided.

SUMMARY OF THE INVENTION

The present invention contemplates a cooking utensil basically comprising two flat-bottomed containers rigidly joined together at an angle with the interiors of the containers in communication and with the bottoms of the containers generally opposed to one another whereby food will be deposited from one container into the other container when the utensil is turned in one direction, and a turning plate is secured in the utensil substantially along the line of joinder between the containers in a position to engage and assist in inverting food being deposited from one container into the other container. The turning plate is sized and positioned to engage an edge of the food being turned, yet does not prevent grease from flowing from one container into the other when the utensil is turned.

An object of the invention is to facilitate the turning of fried foods being cooked without damage to the appearance or edibility of the food.

Another object of this invention is to provide a cooking utensil whereby eggs may be turned by unskilled cooks without breaking the yolks of the eggs.

A further object of this invention is to provide a cooking utensil which may be economically constructed.

Other objects and advantages of the invention will be evident from the following detailed description when read in conjunction with the accompanying drawings which illustrate the invention.

BRIEF DESCRIPTION OF THE DRAWING

FIG. 1 is a side elevational view of a cooking utensil constructed in accordance with this invention.

FIG. 2 is a sectional view as taken along lines 2—2 of FIG. 1.

FIG. 3 is a sectional view taken along lines 3—3 of FIG. 2.

FIG. 4 is a view similar to FIG. 1 of a modified cooking utensil.

FIG. 5 is another view similar to FIG. 1 of another modified cooking utensil.

FIG. 6 is a view similar to FIG. 2 of still another modified cooking utensil.

DESCRIPTION OF THE PREFERRED EMBODIMENTS

Referring to the drawings in detail, and particularly FIGS. 1, 2 and 3, reference character 10 generally designates a cooking utensil basically comprising first and second containers 12 and 14 rigidly joined together along a line or plane 16. In this embodiment, the containers 12 and 14 are disposed at substantially ninety degrees from one another and are joined along a plane 16 extending at forty-five degrees, or along the bisector of the angle between the containers 12 and 14, with the interiors of the containers in communication.

The containers 12 and 14 are substantially circular, as in conventional frying pans, and each is provided with a flat bottom 18 and side walls 20 of equal height. It will be understood that the containers 12 and 14 may be formed of any desired material, such as sheet metal, which will withstand the application of heat when food is being cooked therein. It may also be noted that the containers 12 and 14 may be formed of substantially one piece of material shaped into the configuration shown in the drawing, but will more normally be two separate containers joined by welding along the line of joinder 16.

A suitable handle 22 is rigidly secured to a side wall 20 of one of the containers 12 or 14 for manual turning of the utensil between positions where the container 14 is placed on the cooking surface and the container 12 is placed on the cooking surface.

A turning plate 24 is rigidly secured in the utensil 10 to facilitate the turning of food when the food is moved from one container into the other, as will be set forth more in detail below. The turning plate 24 is secured in the plane of joinder 16 between the containers 12 and 14 in any suitable manner, such as by welding to the side walls 20 of the containers. The width or height of the turning plate 24 is less than the heights of the walls 20, such that the turning plate will not project above the side walls 20 of the container which is extended horizontally in cooking position. It will also be observed in FIGS. 2 and 3 that the lower edge 26 of the turning plate 24 is serrated to provide openings 28 through the turning plate adjacent the bottoms 18 of the containers. The openings 28 provide communication between the containers for the flow of grease or cooking oil from one container to the other container when the containers are turned between their various cooking positions.

In use of the cooking utensil 10, let it be assumed that the utensil is placed over a fire with grease or cooking oil in the container 14 and the container 14 extended horizontally as shown in the drawing. The utensil 10 is particularly suited for the frying of eggs, so let it be further assumed that an egg has been placed in the container 14 and is in the process of being cooked on one side. Just before the egg is finished cooking on one side, the utensil 10 is slightly tilted to raise the container 14 and lower the container 12, whereby a portion of the grease or cooking oil will flow from the container 14 through the openings 28 into the container 12. Then, when the egg has finished cooking on one side, the cook merely lifts the utensil and quickly turns the utensil to raise the container 14 to a vertical position and lower the container 12 to a horizontal position. As shown in the drawing, the utensil would therefore be turned in a counterclockwise direction. As the utensil is turned, the partially cooked egg is moved from the container 14 into the container 12. The turning plate 24 engages an edge of the partially fried egg and facilitates the inversion of the egg into the container 12. When the egg has finished frying on its other side in the container 12, the cook can easily remove the egg by use of the usual egg turner or by simply "pouring" the egg from the container 12.

FIG. 4 illustrates a slightly modified cooking utensil 10a wherein the containers 12 and 14 are extended at somewhat more than ninety degrees from one another, but yet still generally opposed. In this construction, the line of joinder 16 between the containers 12 and 14 will still bisect the angle between the containers, and the turning plate will be secured in the utensil along the plane of the line of joinder 16. Otherwise, the construction of the utensil 10a is the same as the construction of the utensil 10 previously described.

FIG. 5 illustrates another slightly modified cooking utensil 10b wherein the containers 12 and 14 are disposed at an angle somewhat less than ninety degrees from one another. Here again, the line of joinder 16 between the containers 12 and 14 bisects the angle between the containers and the turning plate is positioned in the utensil 10b along the plane of the line of joinder 16. Otherwise, the utensil 10b is constructed in the same manner as the utensil 10.

The further modified cooking utensil 30 partially illustrated in FIG. 6 comprises a pair of containers 32 and 34 having rectangularly shaped flat bottoms 36 and side walls 38 joined together in substantially the same manner as the containers 12 and 14 of the utensil 10 previously described. A turning plate 40 is rigidly secured in the utensil 10 between the containers 32 and 34 to facilitate the turning of food being moved from one container to the other, in the same manner as in the embodiments previously described. It will also be noted that openings 42 are formed in the lower edge of the turning plate 40 for the flow of grease or cooking oil between the containers 32 and 34. Further, a suitable handle 44 is provided on the container 34 for the manual manipulation of the cooking utensil 30.

From the foregoing, it will be apparent that the present invention provides a novel cooking utensil wherein food being fried may be easily inverted without damage to either the appearance or edibility of the food. The food is effectively "flipped" from one container into the other, with the turning plate functioning to engage an edge of the food and facilitate the inversion of the food when it is being moved from one container to the other. The present cooking utensil is particularly suited for frying eggs, whereby any unskilled cook can easily fry the egg on both sides without breaking the yolk. It will further be apparent that the present cooking utensil is of economical construction.

Changes may be made in the combination and arrangement of parts or elements as heretofore set forth in the specification and shown in the drawing without departing from the spirit and scope of the invention as defined by the following claims.

What is claimed is:

1. A cooking utensil, comprising:
   a first container having a substantially flat bottom and side walls;
   a second container having a substantially flat bottom and side walls and rigidly joined to the first container at an angle with the interiors of the containers in communication and with the bottoms of the containers generally opposed to one another whereby food will be deposited from one container into the other container when the utensil is turned in one direction; and
   a turning plate secured in the utensil substantially along a line bisecting the angle between the containers in a position to engage and assist in inverting food being deposited from one container into the other container.

2. A cooking utensil as defined in claim 1 wherein the sidewalls of the containers are of equal height and the turning plate has a width less than the heights of said side walls, and the turning plate is secured in a position not to project above the side walls of the containers.

3. A cooking utensil as defined in claim 1 wherein the turning plate is positioned in the plane along which the side walls of the containers are joined.

4. A cooking utensil as defined in claim 1 wherein the edge of the turning plate adjacent the bottoms of the containers is serrated for the flow of grease or the like from one container to the other container when the utensil is turned to place one container higher than the other container.

5. A cooking utensil as defined in claim 1 wherein the bottoms of the containers are disposed substantially at ninety degrees from one another.

6. A cooking utensil as defined in claim 1 wherein the bottoms of the containers are disposed at greater than ninety degrees from one another.

7. A cooking utensil as defined in claim 1 wherein the bottoms of the containers are disposed at less than ninety degrees from one another.

8. A cooking utensil as defined in claim 1 wherein the bottoms of the containers are substantially circular.

9. A cooking utensil as defined in claim 1 wherein the bottoms of the containers are rectangular.

10. A cooking utensil as defined in claim 1 characterized further to include a handle secured to a side wall of one of the containers for manual manipulation of the utensil.

References Cited

UNITED STATES PATENTS

| 781,081 | 1/1905 | MacFate. | |
| 1,107,987 | 8/1914 | Nash | 99—424 |
| 1,398,655 | 11/1921 | Smith | 99—423 |
| 1,855,075 | 4/1932 | Virneburg | 99—422 |

FOREIGN PATENTS

| 2,779 | 2/1905 | Great Britain. |
| 249,686 | 4/1926 | Great Britain. |
| 673,087 | 6/1952 | Great Britain. |

WALTER A. SCHEEL, *Primary Examiner.*

JOHN M. NEARY, *Assistant Examiner.*